Figure 1:
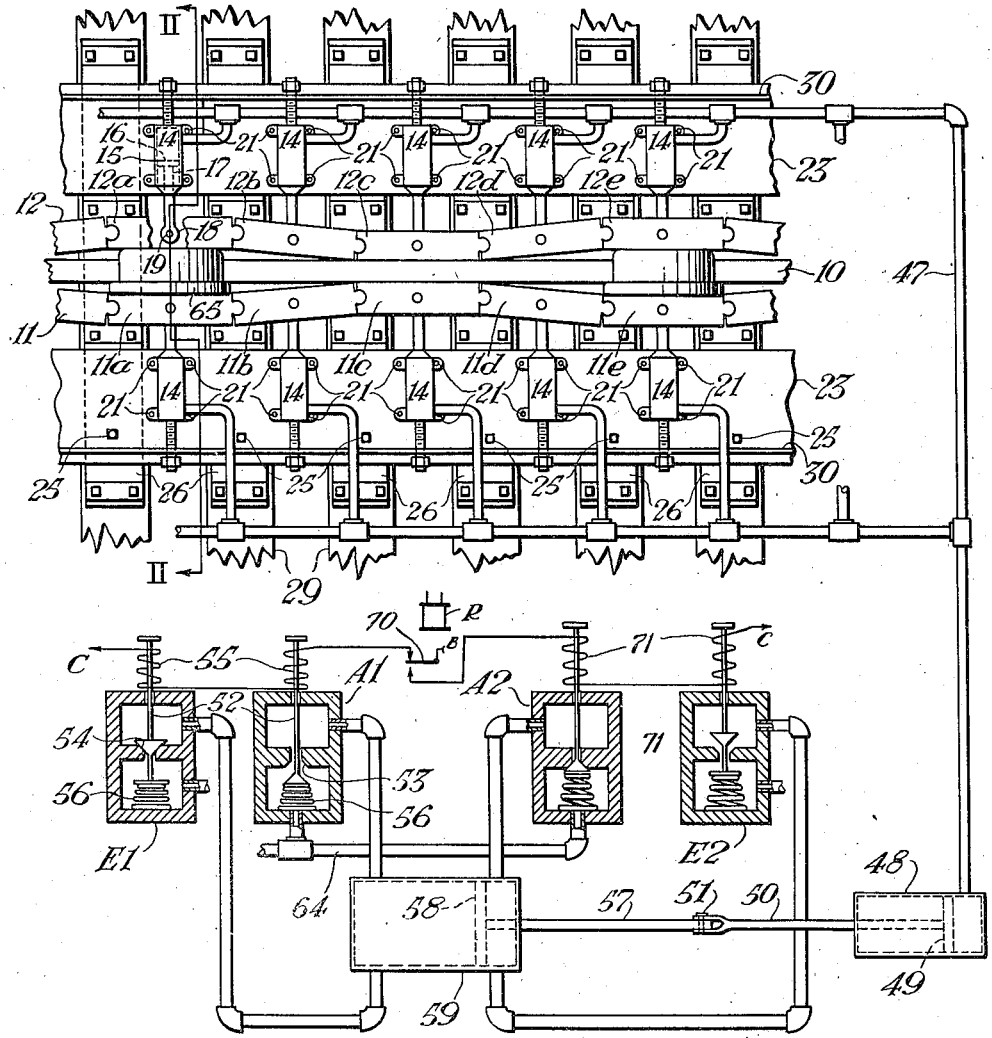

Jan. 15, 1946.　　　G. T. CLARK　　　2,393,146
RAILWAY CAR RETARDER
Filed July 1, 1943　　　2 Sheets-Sheet 1

INVENTOR
Gerald T. Clark
BY
HIS ATTORNEY

Jan. 15, 1946. G. T. CLARK 2,393,146
RAILWAY CAR RETARDER
Filed July 1, 1943 2 Sheets-Sheet 2

INVENTOR
Gerald T. Clark
BY
HIS ATTORNEY

Patented Jan. 15, 1946

2,393,146

UNITED STATES PATENT OFFICE 2,393,146

RAILWAY CAR RETARDER

Gerald T. Clark, Hazel Crest, Ill., assignor to The Union Switch and Signal Company, Swissvale, Pa., a corporation of Pennsylvania Application July 1, 1943, Serial No. 493,024

4 Claims. (Cl. 188—62)

My invention relates to railway car retarders of the type involving track braking bars located in the trackway adjacent to a track rail and arranged to be moved into and out of a braking position in which the bars are disposed to engage the wheels of a car or vehicle.

In the ordinary track brake type of car retarder, the braking bars usually have associated therewith spring biasing means involving complicated lever arrangements for biasing the bars to a normal position, and power operating means actuated by fluid pressure, electric or other type of motors for operating the bars against their bias to another position, which other position may for example be the braking position if the normal spring biased position of the bars is the non-braking position.

My present invention has for an object the provision of novel and improved railway car retarders of the track brake type arranged with fluid pressure motors directly connected with the bars and operated by an incompressible fluid so as to move the bars into and out of a braking position according as fluid is supplied to or withdrawn from the motors.

Another object is the provision of a novel and improved track brake type car retarder wherein the track brake bar operating apparatus is arranged to obviate the use of springs.

A further object is the provision in a car retarder of novel and improved operating means comprising hydraulic motors directly connected with the braking beam sections and driven by a pneumatic motor.

An additional object is to provide novel and improved means for securing the brake beam sections to the retarder structure.

Another object is to provide novel and improved track brake type car retarders.

The above-mentioned and other important objects and characteristic features of my invention which will become readily apparent from the following description are attained in accordance with the invention by attaching one end of each of the rail braking bar sections to the retarder structure by means of depending lugs provided on the one end of the beam and cooperating with slots in a rail chair secured to the retarder, and by providing on each section at the end carrying the lug, a projection which mates with a recess provided in the contiguous end of the next adjacent section and which overlies a portion of such adjacent section. Each of the rail braking bar sections has associated therewith a hydraulic motor supplied with fluid from a master hydraulic cylinder operatively connected with a double-acting pneumatic cylinder which functions to operate the master cylinder and affords a cushioning effect when a section or series of sections are caused to be moved by a car wheel.

I shall describe one form of apparatus embodying my invention, and shall then point out the novel features thereof in claims.

Figure 2:
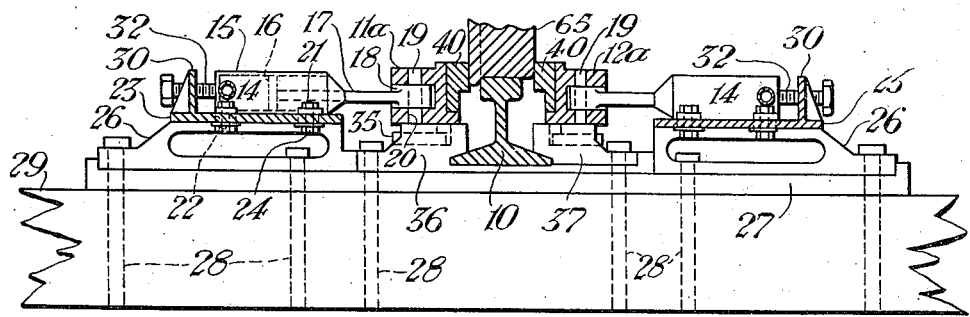
Figure 3:
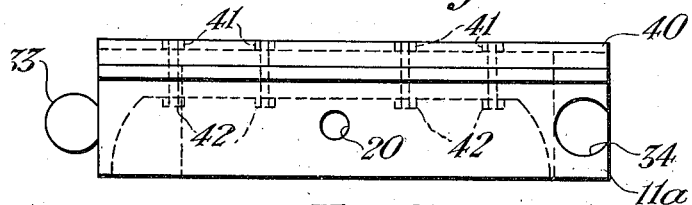
Figures 4, 5:
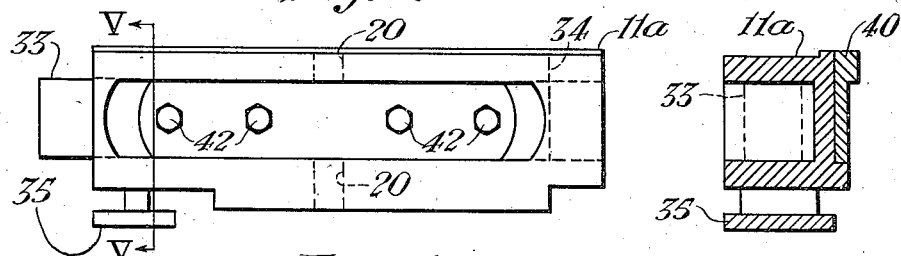
Figures 6, 7:
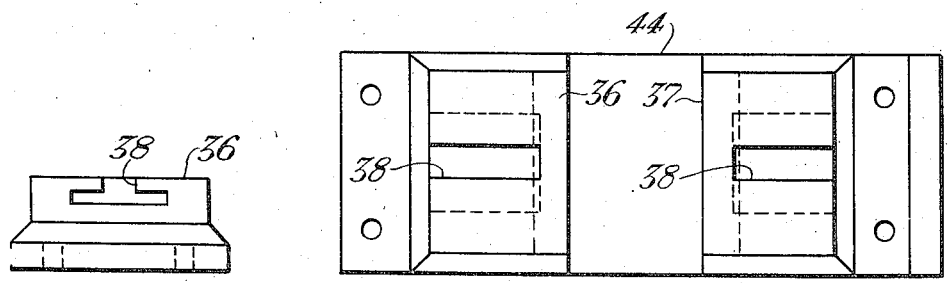

In the accompanying drawings, Fig. 1 is a top plan view showing a portion of a car retarder embodying my present invention. Fig. 2 is a sectional view taken substantially on the line II—II of Fig. 1. Fig. 3 is a top plan view showing on an enlarged scale beam section 11a illustrated in Fig. 1. Fig. 4 is a side elevational view of the member 11a illustrated in Fig. 3. Fig. 5 is a sectional view taken substantially on the line V—V of Fig. 4. Fig. 6 is a top plan view of the pair of rail chairs 36 and 37 which cooperate with the T-shaped lugs of member 11a illustrated in Fig. 4. Fig. 7 is an end view of the pair of rail chairs illustrated in Fig. 6. In each of the several views, similar reference characters have been employed to designate corresponding parts.

Referring first to Figs. 1 and 2, the reference character 10 designates one rail of a pair of track rails forming a part of a stretch of railway track provided with a car retarder structure embodying my invention. In order to simplify the drawings and description, only the portion of the retarder structure associated with rail 10 has been illustrated in the drawings, but it is to be understood, of course, that the apparatus associated with rail 10 will ordinarily be duplicated for the other rail (not shown) of the stretch, although such duplication need not be made if it is desired to provide a single-rail retarder.

The car retarder structure associated with rail 10 comprises brake beams 11 and 12 disposed respectively on opposite sides of and movable toward and away from the track rails, together with actuating mechanisms for the brake beams and means for securing the component parts of the retarder structure in operative relations with each other and to the roadway of the stretch of track.

The brake beam 11 is comprised of a series of relatively short sections 11a, 11b, 11c, etc., which are connected to each other to form a continuous flexible beam. These connecting means as shown involve the provision on one end of each brake section of a cylindrically shaped projection 33 (see Figs. 3 and 4) which mates with a correspondingly shaped recess 34 formed in the contiguous end of the next adjacent section. Each recess 34 is provided with a lip at its base which engages the underside of its mating projection 33, and each section is provided at its projecting end with a T-shaped depending lug 35 which functions to secure the section to the retarder structure in a manner, to be explained hereinafter, which permits the section to slide toward and away from the track rail. The brake beam 12 is likewise comprised of a series of relatively short sections 12a, 12b, 12c, etc., which are connected to each other and are secured to the retarder structure in a manner corresponding to that just described for beam 11.

Each of the brake beam sections 11a, 11b, 12a, 12b, etc., is provided with an actuating mechanism comprising a fluid motor 14 having a cylinder 15 provided with a piston 16 pivotally connected to the center of the associated brake beam section by means of a connecting rod 17 provided with a looped end 18 carrying a pin 19 which is inserted in holes 20 drilled in the top and bottom flanges (see Figs. 3 and 4) of the associated brake beam section. The motors 14 are suitably secured to the retarder structure by means hereinafter described which permit a limited movement of the motors relative to rail 10 to allow for adjustment of the motors, and are supplied with an incompressible or hydraulic fluid from a pipe 47 connected with a master hydraulic cylinder 48. The cylinder 48 has a piston 49 which is caused, in a manner to be explained hereinafter, to force the fluid in cylinder 48 to or withdraw that fluid from pipe 47, thereby causing the motors 14 to move their associated brake sections toward or away from rail 10, respectively.

The rail 10 and the associated retarder structure are supported on track ties 29 each provided with a bearing plate 27 (see Fig. 2) having its ends formed with upturned ledges. The rail 10 is secured in operative relation to the retarder structure by means of rail anchors 36 and 37, one of each being provided for each tie 29. Each rail anchor 36 is provided with an extending portion on which rail 10 is supported and which terminates in an upturned ledge. The two rail anchors 36 and 37 for each tie are shaped to conform to and engage the lower flange of rail 10, as is readily apparent from an inspection of Fig. 2, and rail anchor 37 is disposed between the rail 10 and the upturned ledge of anchor 36. The rail anchors are supported on the bearing plate 27 of the associated tie 29 and are secured to such tie by means of spikes 28 driven through aligned openings in the rail anchors and in plate 27.

Each tie 29 is also provided with a pair of castings 26 supported by the associated plate 27 and disposed on either side of rail 10 between the rail chairs and the upturned ledges of plate 27. The castings 26 are secured to the associated tie 29 by means of spikes 28 which pass through aligned openings in the castings and plate 27, and the castings support two plates 23, one for either side of rail 10, which extend the length of the retarder and are secured to the castings 26 by bolts 25 (see Fig. 1). The plates 23 support the motors 14 and are formed, on their edges remote from rail 10, with an upturned flange 30 which is suitably braced and which is provided with a plurality of threaded openings one for each of the motors supported by the plate. A screw 32 is threaded through each opening and into the end of cylinder 15 of the associated motor 14, thereby providing a means for adjusting the position of the motor relative to rail 10.

The motors 14 are secured to the plates 23 by means of bolts 21 inserted through openings formed in lugs provided on the sides of cylinder 15, and which bolts extend through slotted openings 22 provided in plate 23 and are drawn up by nuts 24. These slotted openings 22 in plate 23 permit the adjusting screws 32 to move motor 14 relative to rail 10.

Each of the brake beam sections 11a, 11b, 12a, etc., is provided with a brake shoe 40 secured by bolts 41 and nuts 42 to the face of the associated brake section so as to confront rail 10 and engage a wheel moving along the rail. As shown in Fig. 2, brake beam section 11a is secured to the retarder structure by means of its depending T-shaped lug 35 which fits into a mating inverted T-shaped slot 38 (see Figs. 7 and 8) provided in rail chair 36. The other brake beam sections are similarly secured to the retarder structure by the engagement of their depending lugs 35 with the slots formed in rail chairs 36 or 37, as the case may be. The slots 38 in the rail chairs terminate short of the track rail and provide a shoulder for limiting the maximum movement of the associated brake section toward the rail.

The operation of piston 49 of master hydraulic cylinder 48, and hence the operation by the motors 14 of the brake beams 11 and 12, is effected by means of a pneumatic motor comprising a cylinder 59 provided with a piston 58 having a piston rod 57. A pin 51 carried in the bifurcated end of connecting rod 50 of piston 49 of the master hydraulic cylinder 48, operatively connects rod 57 to rod 50.

In order to control the supply of a compressible fluid, such as air, to cylinder 59, each end of that cylinder is provided with a pair of valve magnets, one for controlling the admission of air to and the other for controlling the exhaust of air from the associated end of the cylinder. The admission and exhaust valve magnets are designated respectively by the reference characters A and E, with suitably distinguishing suffixes, and are controlled by suitable control circuits which may, for example, be of the type illustrated in the drawing wherein a relay R, controlled in any suitable manner, when picked up completes through the front point of its contact 70 an obvious circuit extending from one terminal B of a suitable source of current, such as a battery not shown, through the front point of contact 70 of relay R and the windings 55 of valve magnets A1 and E1, in series, to the other terminal C of the same source of current. When relay R is released, the circuit just traced is interrupted so that both valve magnets A1 and E1 become deenergized, and the windings 71 of valve magnets A2 and E2 become energized over an obvious circuit which may be traced from terminal B through the back point of contact 70 of relay R, and the windings 71 of valve magnets A2 and E2, in series, to the other terminal C. When the two valve magnets at an end of the cylinder are energized in series, as shown, the valves controlled thereby are arranged so that whenever either valve is open, the other is closed. In other words, admission valve magnet A1, for example, is arranged so that whenever its winding 55 is energized, its valve stem 52 is caused to move and open the port 53 to permit air to flow from a pipe 64, connected with a suitable source of air pressure, such as a compressor not shown, to the left-hand end, as viewed in Fig. 1, of cylinder 59 while at the same time the energization of winding 55 of exhaust valve magnet E1 causes its valve stem 52 to close port 54 and thus prevent the exhaust of air from the left-hand end of cylinder 59 to atmosphere. When winding 55 of valve magnets A1 and E1 are deenergized, spring 56 causes valve stem 52 to close port 53 of valve magnet A1, thus cutting off the supply of air to the left-hand end of cylinder 59, while port 54 of valve magnet E1 is caused to open, to vent the left-hand end of cylinder 59 to atmosphere, by spring 56 acting on stem 52. It follows, therefore, that when the windings of valve magnets A1 and E1 are energized, the port of valve magnet A1 is opened and the port of valve magnet E1 is closed, whereas when the windings of the valve magnets are deenergized, the port of valve magnet A1 is closed and the port of valve magnet E1 is opened. The other pair of valve magnets A2 and E2 are similarly controlled and arranged, and it is obvious from an inspection of the drawing that the control circuits of the two pairs of valve magnets are so arranged that either pair of magnets may be energized only if the other pair is deenergized. In this manner, air cannot be supplied simultaneously to both ends of cylinder 59, and whenever air is supplied to either end of the cylinder, the other end is then vented to atmosphere to enable the air supplied to the cylinder to cause movement of piston 58 without building up an opposing pressure in the cylinder.

The car retarder structure operates as follows: When it is desired to retard the movement of a vehicle over rail 10, magnet valves A1 and E1 are energized so that air is admitted to the left-hand end of cylinder 59 to force pistons 58 and 49 toward their respective right-hand ends. This movement of piston 49 causes the fluid in cylinder 48 to be forced through pipe 47 into the motors 14 to thereby cause the motors to move their respective brake beams toward rail 10 into their wheel engaging positions. When a car enters the retarder, its wheels 65 must force a path between the two flexible brake beams 11 and 12 by displacing the individual brake beam sections 11a, 11b, 12a, 12b, etc. As shown in Fig. 1, a wheel 65 has displaced the brake beam sections 11a and 12a, and continued movement of the wheel toward the right (as viewed in the drawings) requires the wheel to displace the opposed pairs of brake beam sections 11b and 12b; 11c and 12c, etc. Each pair of brake beam sections therefore exerts a retarding force on wheel 65. The pneumatic cylinder 59 provides a means for absorbing the force exerted by each wheel 65 on the brake beam sections, thereby permitting movement of the sections to take place while maintaining the pressure exerted by the beam sections on the wheels.

When it is desired to release the pressure of the brake beams on the car wheels in the retarder, or if a car is to traverse the retarder but is not to be retarded therein, the valve magnets A1 and E1 are deenergized and valve magnets A2 and E2 are energized. The left-hand end of cylinder 59 is thus vented to the atmosphere, while air is cut off from the left-hand end and is supplied to the right-hand end of the cylinder which is closed to the atmosphere by the closure of the port of valve magnet E2. Pistons 58 and 49 are therefore driven to their left-hand positions and fluid is withdrawn through pipe 47 from the motors 14, thereby causing the motors to move their respective brake beam sections away from rail 10 to their non-braking positions wherein car wheels are permitted to pass through the retarder without opposition.

An advantage of a car retarder embodying my invention is the provision of a novel and improved operating means wherewith the braking bars are moved into and out of a braking position by means of hydraulic motors, thus dispensing with complicated lever arrangements and other mechanical structures found in most retarders. Another advantage is that the master hydraulic cylinder is operated by a pneumatic motor which provides a resilient or cushioning means enabling displacement of the braking bars to take place while maintaining pressure on such bars. These resilient means obviate the necessity for springs and other resilient or biasing means ordinarily employed in retarders. A further advantage resides in the provision of improved and simplified means for securing the rail braking bars to the retarder structure.

Although I have herein shown and described only one form of a car retarder embodying my invention, it is understood that various changes and modifications may be made therein within the scope of the appended claims without departing from the spirit and scope of my invention.

Having thus described my invention, what I claim is:

1. In a track brake type car retarder, in combination with a braking member comprising a plurality of sections, the adjoining ends of which sections are provided with mating tongue and groove portions which connect together the adjacent sections, a plurality of rail chairs one for each braking section having T-shaped slots secured to the ties, and a T-shaped portion provided on the tongued end of each of said sections for entering the T-shaped slot of the associated rail chair, the tongue of each section overlying a lip on the grooved end of the adjacent section whereby said T-shaped portion serves to hold down both the one end of its associated section and the adjacent end of the adjoining section.

2. In a car retarder, in combination, a brake beam comprised of a plurality of sections flexibly connected together, a plurality of hydraulic motors one operatively connected with each of said plurality of sections, a source of hydraulic fluid connected with all of said motors, and a pneumatic motor operatively connected with said source for forcing fluid to or withdrawing fluid from said motors.

3. In a car retarder, in combination, a plurality of brake beam sections arranged in operative relation to a track rail, means for flexibly connecting together said sections to form a single brake bar, a plurality of hydraulic motors one operatively connected with each of said plurality of sections, a master hydraulic cylinder connected with all of said motors, hydraulic fluid in said master cylinder, and a pneumatic motor having a piston connected with another piston operating in said master hydraulic cylinder, whereby operation of said pneumatic motor effects operation of said other piston to cause said fluid to be forced into or withdrawn form said motors to effect operation of said brake beam sections toward and away from said track rail.

4. In a track brake type car retarder, in combination with a braking member comprising a plurality of sections, the adjoining ends of which sections are provided with mating tongue and groove portions which connect together the adjacent sections, a plurality of rail chairs one for each braking section secured to the ties and provided with T-shaped slots, and a T-shaped portion provided on one end of each of said sections for entering the T-shaped slot of the associated rail chair, the mating portion of the one end of each section overlying a projecting portion on the other end of the adjacent section whereby said T-shaped portion serves to hold down both the one end of its associated section and the adjacent end of the adjoining section.

GERALD T. CLARK.